Apr. 17, 1923.
W. A. HORROCKS
1,451,733
MOTOR SLEIGH
Filed May 28, 1921
4 sheets-sheet 4
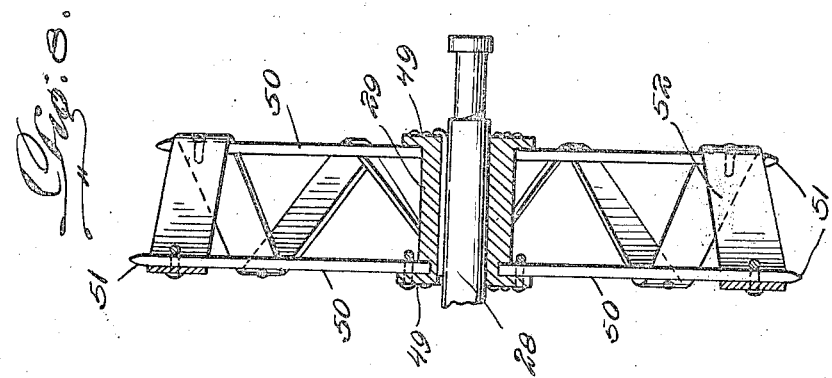
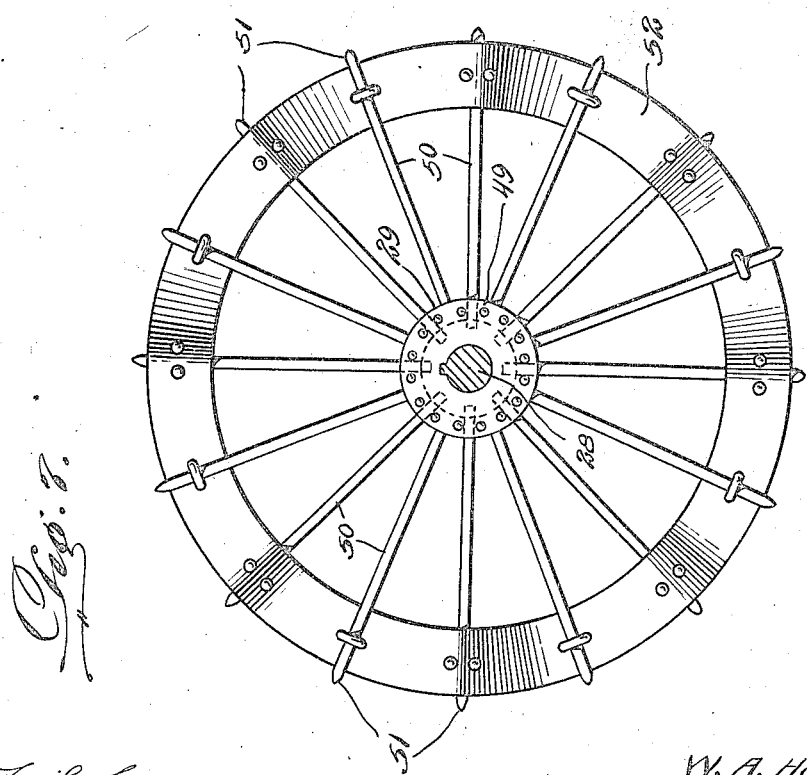
W. A. Horrock
INVENTOR
BY Victor J. Evans
ATTORNEY
WITNESSES:

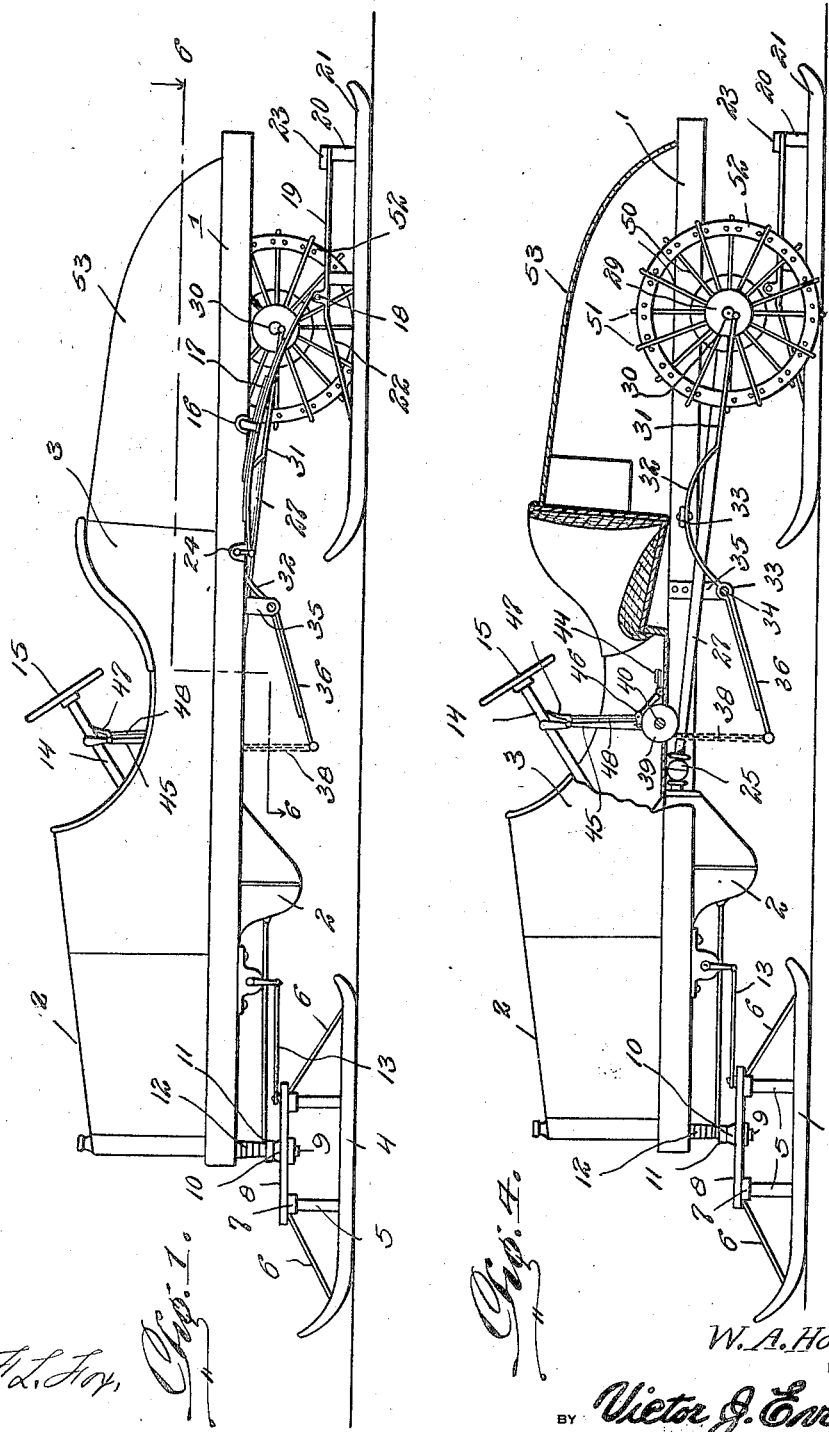

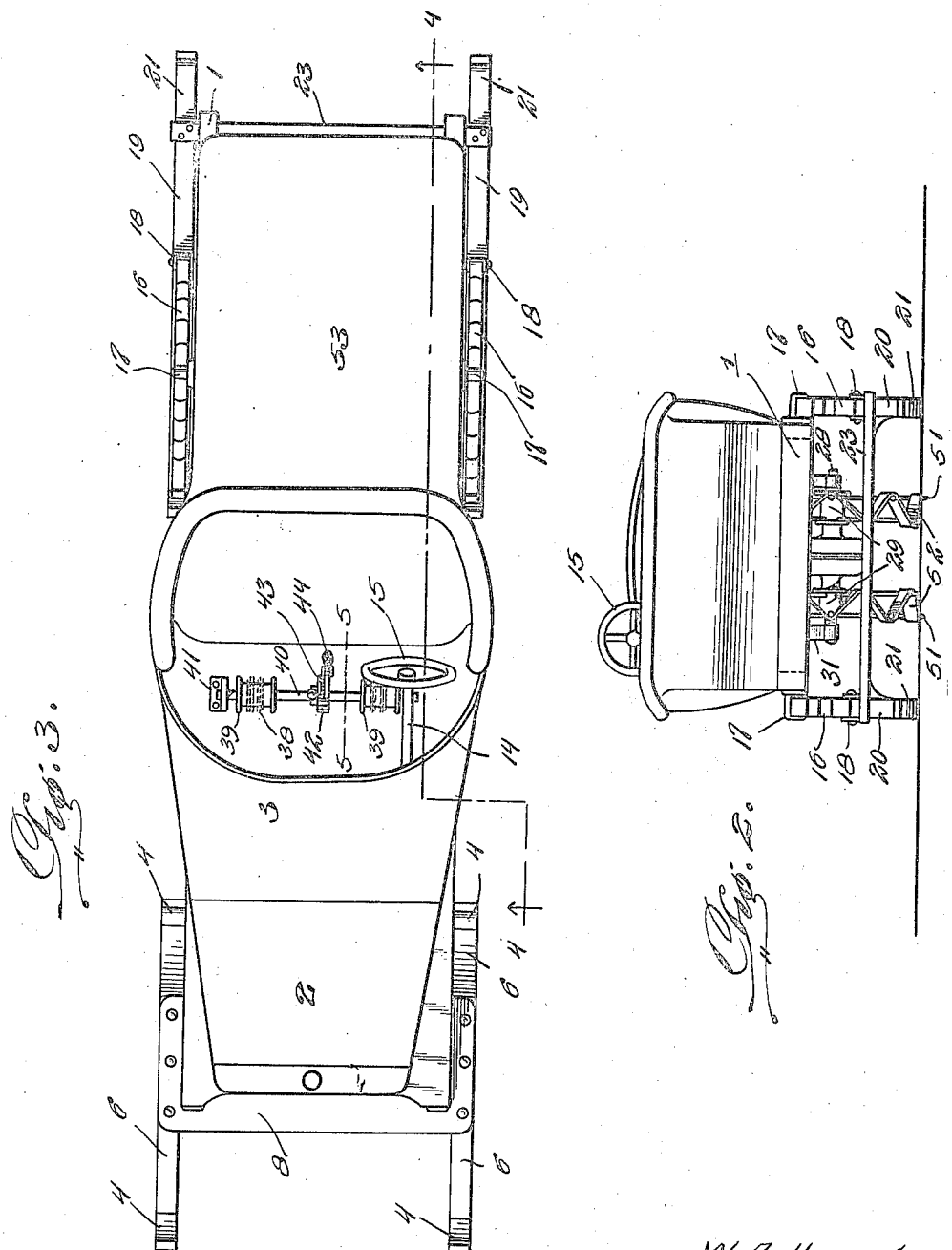

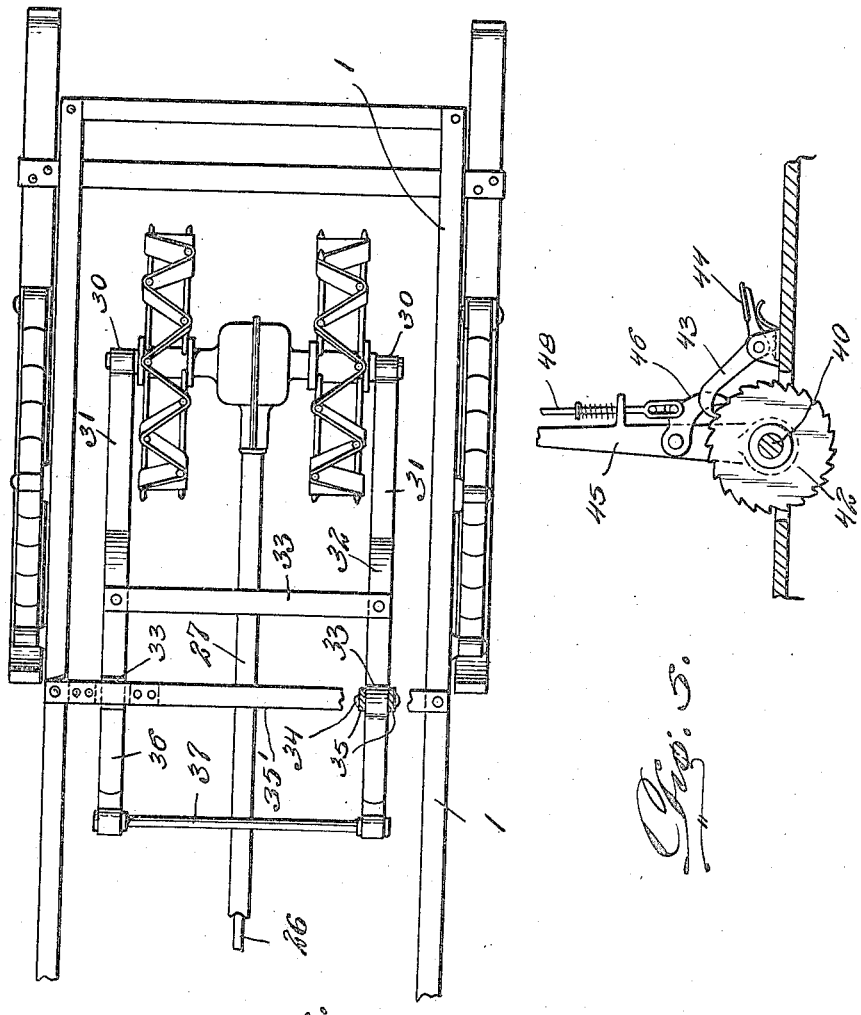

Patented Apr. 17, 1923.

1,451,733

UNITED STATES PATENT OFFICE.

WILLIAM ALBERT HORROCKS, OF WILTON, MAINE.

MOTOR SLEIGH.

Application filed May 28, 1921. Serial No. 473,524.

*To all whom it may concern:*

Be it known that I, WILLIAM A. HORROCKS, a citizen of the United States, residing at Wilton, in the county of Franklin and State of Maine, have invented new and useful Improvements in Motor Sleighs, of which the following is a specification.

My present invention has reference to a motor propelled sleigh.

My primary object is to produce a motor propelled sleigh in which the ground contact wheels may be readily adjusted to engage with the surface over which the device travels.

A further object is to produce a motor propelled sleigh in which the ground engaging wheels are of a construction to effectively engage the snow or other icy surface to insure traction between the vehicle and such surface without danger of the snow or ice clogging the said wheels.

A further object is to produce a motor propelled sleigh which can be accurately guided and controlled, and wherein the ground engaging or traction wheels are adjusted by mechanism conveniently located with respect to the driver so that the said wheels may be brought either below or above the rear runners to suit varying conditions, as for instance, when the vehicle is traveling over soft deep snow, or up hardened icy surfaces the traction wheels may be lowered to engage the ground but when the sleigh is traveling down an incline the traction wheels may be elevated above the rear runners so as to not interfere with momentum given to the sleigh by such downward inclination.

The foregoing, and many other objects which will appear as the nature of the invention is better understood, may be accomplished by a construction, combination and operative association of parts, such as is disclosed by the drawings which accompany and which form part of this specification.

In the drawings:—

Figure 1 is a side elevation of a motor sleigh in accordance with this invention.

Figure 2 is a rear elevation thereof.

Figure 3 is a top plan view thereof.

Figure 4 is a sectional view on the line 4—4 of Figure 3.

Figure 5 is a sectional view on the line 5—5 of Figure 3.

Figure 6 is a sectional view on the line 6—6 of Figure 1.

Figures 7 and 8 illustrate details of the traction wheel construction.

The frame of my improved sleigh is indicated by the numeral 1, the same being constructed, in the usual manner, of channeled irons. The motor is mounted on the forward end of the frame, the same being enclosed in the usual hood 2, and to the rear of the motor is the body 3. The motor is controlled by the usual means conveniently located in the body with respect to the driver's seat.

The front runners are indicated by the numeral 4. Each runner has upstanding members or raves 5 suitably braced, as at 6 and connected by transverse members 7 on which is secured a plate 8 that is pivotally connected by a king pin 9 to a fifth wheel 10 that has a bearing beneath an element 11 secured centrally on the front springs 12. To the plate 10 there is secured the steering gear rods 13 which are designed for operation, in the usual manner by the steering post which is encased in the usual steering post column 14 and which is operated by the steering wheel 15.

On the side members of the frame 1, beneath the rear of the body 3 there are secured by the usual clips 16 downwardly rounded semi-elliptical springs 17, each of said springs having its free end secured by means 18 on longitudinal bars 19 which are secured by uprights 20 to the rear runners 21. The bars 19 are suitably braced to the front of the runners, as at 22, and are connected together at the rear ends thereof, as at 23. The semi-elliptical springs are also connected to the frame by means 24. It will thus be noted that the rear runners 21 are yieldably supported from the rear of the frame 1. Connected to the power shaft of the motor 2 through the medium of the universal joint 25 is the drive shaft 26 which is suitably encased in a tube 27. The drive shaft is arranged at a downward angle with respect to the frame 1 and is centrally arranged between the rear runners 21. The drive shaft is connected by the usual differential (which is suitably housed) to the rear axle shafts which are journaled on antifrictional bearings in the rear axle casing. To the rear axle shafts 28 there are connected, in the usual manner, the hubs 29 of the tractor wheels. By reference to the drawings it will be noted that the tractor wheels are arranged in comparatively close relation to each other, each wheel being positioned a suitable distance inward of the respective rear runner 29, and also that the axles 28 project a suitable distance beyond the sides of the traction wheels. On the projecting ends of the said axles 28 there are loosely supported hangers 30, and to each of these hangers there is secured one of the straight ends of a spring rod 31. The rods, from their connection with the hangers 30 are rounded upon themselves, as at 32, the said rounded portions being connected by transverse means 33, and at the terminals of the said rounded portions, the spring rods 31 are formed with bearing eyes 33 for pivots 34 arranged in depending hangers 35 that are secured to the side members of the frame 1 through the medium of the transverse member 35'. From their pivotal connections with the hangers 35 the rods 31 are continued at a downward angle with respect to the frame and body. These portions, for distinction, are indicated by the numeral 36 and are suitably connected by a transverse member 37. The transverse member 37 has secured thereto flexible elements such as chains 38, the said chains passing through suitable openings in the floor of the body 3 and being wound around and secured to a drum 39 that has its shaft or trunnion 40 journaled in suitable bearings 41. To the short shaft or trunnion 40 there is secured a ratchet wheel 42 that is engaged by a spring influenced pawl 43 having a tail portion 44 conveniently arranged with respect to the foot of the operator of the device. Also on the mentioned short shaft or trunnion there is mounted a lever 45 that carries a spring influenced dog 46 operable through the medium of a handle 47 pivotally connected to the lever and loosely connected to the dog by a rod 48. By releasing the holding dog, and oscillating the handle, the drum can be readily turned to swing the spring rods 31 on their pivotal connection with the hangers, and consequently the traction wheels can be brought either above or below the ground engaging shoes of the runners 21.

Each traction wheel is of a peculiar construction. On the hub 29 of each of the traction wheels I secure a flat, comparatively large disk or ring member 49. To the opposite faces of each disk I bolt the radially inclined tangentially disposed spokes 50. The spokes on one side of each disk are arranged intermediate with respect to the spokes on the opposite sides of the said disk. The spokes are constructed of metal and are each of an equal length and have their outer ends pointed, as at 51. On the outer face of each spoke, slightly inward of the pointed ends 51 thereof there is secured, by bolts or the like, the rounded portion of a plate 52 that provides the rim of the traction wheels. The rim is preferably constructed from a single sheet of flat metal, bent upon itself to provide a continuous wavy surface and is, of course, annular in side elevation. The angle portions between the opposed tangentially arranged spokes provide calks which readily engage either a soft or hardened ground surface. The V-shaped passages between the calks permit of free sliding therethrough of snow or ice, while the rotary movement of the traction wheels, and force of resistance exerted thereagainst when the same are brought in surface contacting engagement is sufficient to impart a vibratory movement to the wheels which will effect in shaking therefrom substances which would otherwise adhere thereto.

The traction wheels may be covered by a suitable shield 53 that is supported between the rear of the frame 1 and the rear of the body 3, and it is thought that the foregoing description, when taken in connection with the drawings will amply set forth the construction, operation and advantages of the improvement. It is thought necessary to state that the invention is not to be restricted to the details illustrated and described, but is susceptible to all such changes therefrom as fall within the scope of what is claimed.

It is obvious that by reversing the motor, the traction wheels will serve as brakes.

Having described the invention, I claim:—

In a motor propelled sleigh, a frame having a motor and a body supported thereon, and rear runners carried thereby, uprights rising from the rear runners adjacent the rear end thereof, longitudinal bars supported by the uprights, a pair of downwardly rounded semi-elliptical springs having their upper ends pivotally secured to the frame and their lower ends pivotally secured to the longitudinal bars respectively, spring clips securing the springs intermediate of their ends to the frame, tractor wheels arranged between the rear runners in close relation to each other, an axle shaft for the wheels and being designed to project beyond the opposite sides of the wheels, hangers arranged on the projecting ends of the axle shaft, spring rods disposed longitudinally and having their rear ends secured to the hangers and being provided intermediate of their ends with a bearing eye, a transverse member having its ends secured to the frame, said bearing eyes being pivoted to the transverse member, a second transverse member connecting the free ends of the rods together slightly in advance of the center of the frame and said rods adjacent this connecting point inclined downwardly, drums rotatably mounted above the floor of the body, means for rotating the drums and chains connecting the second transverse member with the drums for the purpose specified.

In testimony whereof I affix my signature.

WILLIAM ALBERT HORROCKS.